United States Patent
Golling et al.

(10) Patent No.: US 8,372,236 B2
(45) Date of Patent: Feb. 12, 2013

(54) METHOD TO HEAT A THERMOPLASTIC BOARDS BY MEANS OF HEAT CONDUCTION

(75) Inventors: Franz Golling, Augsburg (DE); Michael Ippisch, Augsburg (DE); Christian Mayr, Bad Woerishofen (DE)

(73) Assignee: Premium AEROTEC GmbH, Augsburg (DE)

( * ) Notice: Subject to any disclaimer, the term of this patent is extended or adjusted under 35 U.S.C. 154(b) by 119 days.

(21) Appl. No.: 12/837,860

(22) Filed: Jul. 16, 2010

(65) Prior Publication Data

US 2011/0011530 A1 Jan. 20, 2011

(30) Foreign Application Priority Data

Jul. 16, 2009 (DE) .......................... 10 2009 033 701

(51) Int. Cl.
*B29C 65/00* (2006.01)
*B29C 70/52* (2006.01)
*B32B 37/00* (2006.01)
*C08J 5/00* (2006.01)
*C09J 5/02* (2006.01)
*B31B 1/60* (2006.01)

(52) U.S. Cl. ..................... 156/308.2; 156/166; 156/182; 156/324.4; 156/60

(58) Field of Classification Search ............... 156/308.2, 156/166, 182, 324.4, 60
See application file for complete search history.

(56) References Cited

U.S. PATENT DOCUMENTS

| 3,664,912 | A  | * | 5/1972 | Olson ........................... 428/198 |
| 7,482,048 | B2 | * | 1/2009 | Boutghrit et al. ............... 428/58 |
| 2005/0136233 | A1 | * | 6/2005 | Samuels et al. ............... 428/212 |

* cited by examiner

*Primary Examiner* — Katarzyna Wyrozebski Lee
*Assistant Examiner* — Matthew Hoover
(74) *Attorney, Agent, or Firm* — Crowell & Moring LLP

(57) ABSTRACT

A method of heating a thermoplastic board by heat conduction in a heating system which has at least a first surface contacting tool and a second surface containing tool spaced from the first tool, at least one of which is heatable. The thermoplastic board is placed into the heating system between the two surface contacting tools, with an auxiliary sheet being placed between the contact surface of the respective heatable surface contacting tool and the surface of the thermoplastic board facing it. The space between the two surface contacting tools is then reduced to a predefined gap measurement, and the heatable surface contacting tool or tools is heated.

10 Claims, 1 Drawing Sheet

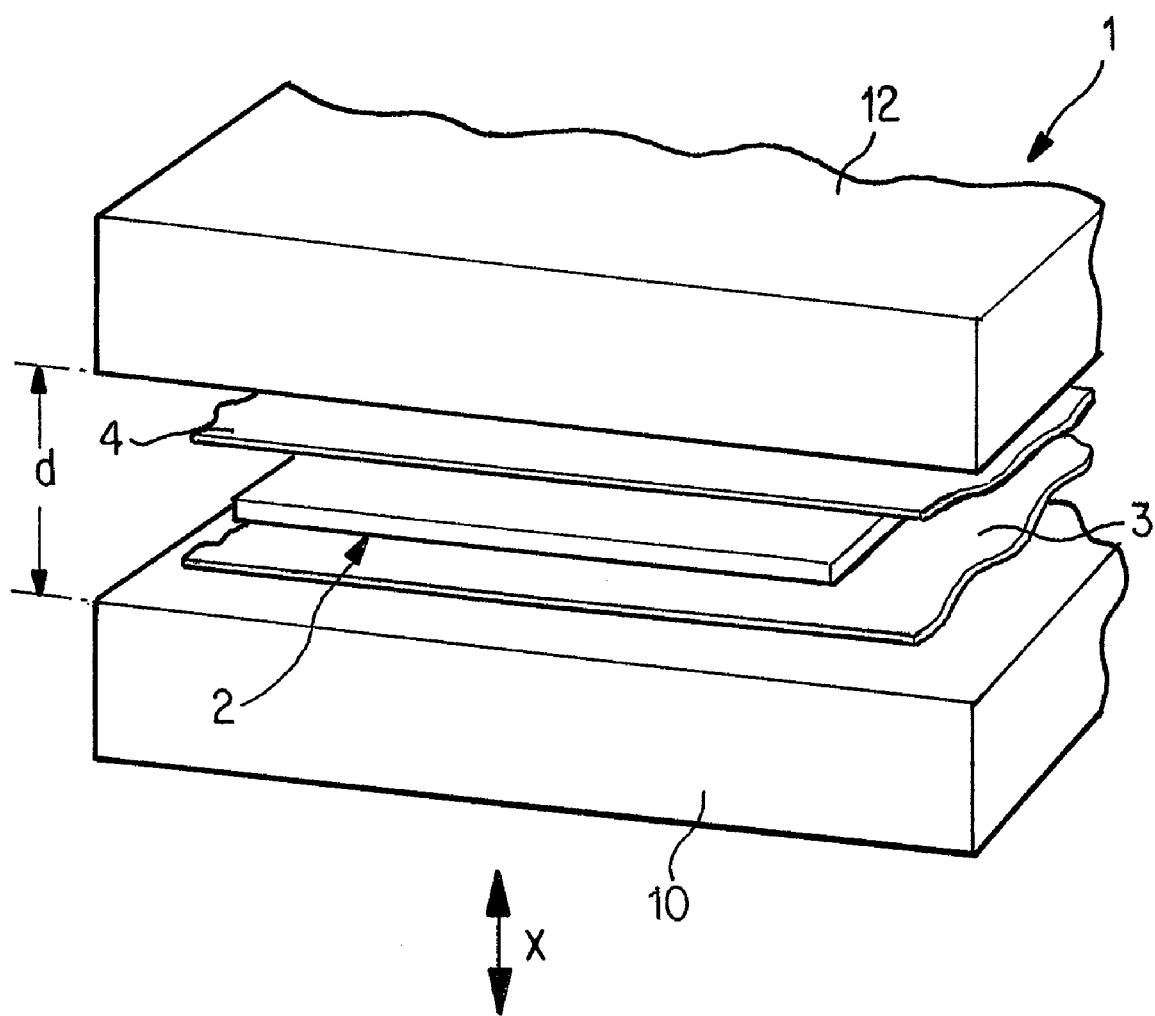

METHOD TO HEAT A THERMOPLASTIC BOARDS BY MEANS OF HEAT CONDUCTION

BACKGROUND OF THE INVENTION

This application claims the priority of German patent document 10 2009 033 701.6-16, filed Jul. 16, 2009, the disclosure of which is expressly incorporated by reference herein.

The present invention relates to a method of heating thermoplastic boards, particularly thermoplastic boards having fiber reinforcement, such as carbon fibers.

Conventionally, boards of this type are heated up by means of infrared radiation so that they can be plastically deformed. In the event of unfavorable outside influences, the heating-up of particularly large-surface boards by means of infrared radiation may be inhomogeneous, so that different temperatures are caused on the surface of the thermoplastic board and therefore also in its material at different locations. The heating of the board by means of infrared radiation frequently has the effect that the material of the thermoplastic board will swell, leading to porosities on the surface of the thermoplastic board.

The inventors' experiments concerning the heating of thermoplastic boards by means of heat conduction in a heating system which comes in contact with the surface of the thermoplastic board have shown that there is the risk that the heated material of the thermoplastic board may adhere to the surface of the part of the heating system that comes in contact with the board. The resulting cleaning expenditures for the heating system are quite considerable and the surface of the thermoplastic board will become unsightly as a result of this gluing-together.

SUMMARY OF THE INVENTION

It is therefore an object of the present invention to provide a method of the above-mentioned type for heating thermoplastic boards by means of which a homogeneous heating of the entire thermoplastic board can be achieved, without impairing the surface of the board and without any adherence to warm parts of the heating system.

This and other objects and advantages are achieved by the method according to the invention, in which the thermoplastic boards are heated by heat conduction in a heating system which has at least a first surface contacting tool and a second surface containing tool spaced from the first tool, with the first surface contacting tool and/or the second surface contacting tool being heatable. For this purpose, the following steps are carried out:

a) Placing the thermoplastic board into the heating system between the two surface contacting tools, an auxiliary sheeting being placed between the contact surface of the respective heatable surface contacting tool and the surface of the thermoplastic board facing this contact surface;

b) reducing the space between the two surface contacting tools to a predefined gap measurement; and c) heating the heatable surface contacting tool or tools.

This approach according to the invention provides a uniform heating of the thermoplastic board over the extent of its entire surface without any adherence of material of the thermoplastic board to one of the surface contacting tools. The auxiliary sheeting is used as a separating agent between the surface of the thermoplastic board and the surface of the surface contacting tool. Simultaneously, the surface of the thermoplastic board is sealed by the auxiliary sheeting, so that the surface of the heated thermoplastic board has no contact with the ambient air, and as a result, the occurrence of porosities will be prevented. In addition, the auxiliary sheeting acts as a separating agent, facilitating the removal of the thermoplastic board from the heating system.

Both the first surface contacting tool and the second surface contacting tool are preferably heatable. This preferred further development of the method according to the invention is further distinguished by the fact that a first auxiliary sheeting is placed between the thermoplastic board and the first surface contacting tool, and a second auxiliary sheeting is placed between the thermoplastic board and the second surface contacting tool. As a result, it becomes possible to accelerate heating of the thermoplastic board, because the latter receives the heat from both surface sides by heat conduction.

The predefined gap measurement preferably corresponds to the sum of the thickness of the thermoplastic board and one or both auxiliary sheeting(s). As a result, it is ensured that the thermoplastic board will have the same thickness measurement after the heating as before.

The melting temperature of the auxiliary sheeting preferably is higher than the melting temperature of the thermoplastic board. It is particularly advantageous if the melting temperature of the auxiliary sheeting is far enough above the melting temperature of the thermoplastic board that, although the auxiliary sheeting glues to the thermoplastic board, it does not adhere to the assigned surface contacting tool.

After heating by the method according to the invention, the thermoplastic board can be subjected directly to a deforming operation in a deforming tool. In this case, the auxiliary sheeting promotes the removal of the deformed thermoplastic board from the forming tool. During the deforming, the auxiliary sheeting promotes a sliding of the material along the mold surface of the deforming tool.

Preferred embodiments of the invention with additional embodiment details and further advantages will be described and explained in the following with reference to the attached drawing.

BRIEF DESCRIPTION OF THE DRAWING

The single FIGURE shows the arrangement of a thermoplastic board in a heating system during the implementation of the method according to the invention.

DETAILED DESCRIPTION OF THE PREFERRED EMBODIMENTS

The FIGURE illustrates a heating system 1 which has a (lower) first surface contacting tool 10 and a second (upper) surface contacting tool 12. The two surface contacting tools 10, 12 have heatable constructions. The surface contacting tools 10, 12 are, displaceably toward one another in the direction of the double arrow X, disposed on a corresponding device of the heating system 1.

A first auxiliary sheet 3 is placed on the upper surface of the lower surface contacting tool 10 facing the upper surface contacting tool 12, on which sheet 3, in turn, a thermoplastic board is placed. A second auxiliary sheet 4 is arranged between the thermoplastic board 2 and the lower surface of the second surface contacting tool 12 facing the first surface contacting tool 10.

After the thermoplastic board 2 and the two auxiliary sheet 3, 4 have been placed between the two surface contacting tools 10, 12 in this manner, the two surface contacting tools 10, 12 will be moved toward one another, whereby the distance d between the mutually opposite surfaces of the surface contacting tools 10, 12 is reduced to a predefined gap measurement. This gap measurement is selected such that the thermoplastic board 2 and the two auxiliary sheets 3, 4 are clamped between the surface contacting tools while being in mutual surface contact.

Subsequently, the two surface contacting tools 10, 12 are heated, whereby the thermoplastic board 2 and the auxiliary sheet 3, 4 are warmed up. In this case, a sufficient amount of heat is transferred onto the thermoplastic board 2 so that the latter becomes so soft that it can be plastically deformed in a subsequent processing step.

The reference numbers in the claims, the description and the drawing are used only for improving the clarity of the invention and should not limit its scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Heating system
2 Thermoplastic board
3 Auxiliary sheeting
4 Auxiliary sheeting
10 Surface contacting tool
12 Surface contacting tool
d Space

What is claimed is:

1. A method of heating thermoplastic boards by heat conduction in a heating system which has at least a first surface contacting tool and a second surface containing tool spaced from the first tool, with at least one of the first surface contacting tool and the second surface contacting tool being heatable, said method comprising:
   placing the thermoplastic board into the heating system between the two surface contacting tools;
   placing at least one auxiliary sheet between the contact surface of each respective heatable surface contacting tool and the surface of the thermoplastic board facing it;
   reducing a space between the two surface contacting tools to a predefined gap measurement; and
   heating the at least one of the heatable surface contacting tool, wherein the thermoplastic board has a same thickness measurement before and after heating.

2. The method according to claim 1, wherein:
   the at least one auxiliary sheet comprises a first and second auxiliary sheet;
   both the first and second surface contacting tools are heatable;
   the first auxiliary sheet is placed between the thermoplastic board and the first surface contacting tool;
   the second auxiliary sheet is placed between the thermoplastic board and the second surface contacting tool; and
   the first and second surface contacting tools are heated.

3. A method of heating thermoplastic boards by heat conduction in a heating system which has at least a first surface contacting tool and a second surface containing tool spaced from the first tool, with at least one of the first surface contacting tool and the second surface contacting tool being heatable, said method comprising:
   placing the thermoplastic board into the heating system between the two surface contacting tools;
   placing at least one auxiliary sheet between the contact surface of each respective heatable surface contacting tool and the surface of the thermoplastic board facing it;
   reducing a space between the two surface contacting tools to a predefined gap measurement; and
   heating the at least one of the heatable surface contacting tool, wherein the predefined gap measurement corresponds to the sum of a thickness of the thermoplastic board and the at least one auxiliary sheet and the thermoplastic board has a same thickness measurement before and after heating.

4. The method according to claim 1, wherein a melting temperature of the at least one auxiliary sheet is higher than a melting temperature of the thermoplastic board.

5. The method according to claim 4, wherein the melting temperature of the at least one auxiliary sheeting is sufficiently greater than the melting temperature of the thermoplastic board that, although the at least one auxiliary sheet is glued to the thermoplastic board, it will not adhere to the assigned surface contacting tool.

6. The method according to claim 1, further comprising:
   plastically deforming the thermoplastic board subsequent to the heating of the thermoplastic board.

7. The method according to claim 3, wherein:
   the at least one auxiliary sheet comprises a first and second auxiliary sheet;
   both the first and second surface contacting tools are heatable;
   the first auxiliary sheet is placed between the thermoplastic board and the first surface contacting tool;
   the second auxiliary sheet is placed between the thermoplastic board and the second surface contacting tool; and
   the first and second surfaces are heated.

8. The method according to claim 3, wherein a melting temperature of the at least one auxiliary sheet is higher than a melting temperature of the thermoplastic board.

9. The method according to claim 8, wherein the melting temperature of the at least one auxiliary sheeting is sufficiently greater than the melting temperature of the thermoplastic board that, although the at least one auxiliary sheet is glued to the thermoplastic board, it will not adhere to the assigned surface contacting tool.

10. The method according to claim 3, further comprising:
    plastically deforming the thermoplastic board subsequent to the heating of the thermoplastic board.

* * * * *